United States Patent
Tseng et al.

(10) Patent No.: US 9,369,523 B2
(45) Date of Patent: Jun. 14, 2016

(54) METHOD FOR EXCHANGING NETWORK MESSAGES IN DISTRIBUTED MANNER

(71) Applicant: D-Link Corporation, Taipei (TW)

(72) Inventors: Chien-Chao Tseng, Hsinchu (TW); Chia-Liang Lin, Pingtung (TW)

(73) Assignee: D-LINK CORPORATION, Taipei (TW)

( * ) Notice: Subject to any disclaimer, the term of this patent is extended or adjusted under 35 U.S.C. 154(b) by 462 days.

(21) Appl. No.: 13/912,535

(22) Filed: Jun. 7, 2013

(65) Prior Publication Data

US 2014/0310356 A1 Oct. 16, 2014

(30) Foreign Application Priority Data

Apr. 10, 2013 (TW) .............................. 102112656 A

(51) Int. Cl.
*G06F 15/16* (2006.01)
*H04L 29/08* (2006.01)
*H04L 29/12* (2006.01)
*H04L 29/06* (2006.01)

(52) U.S. Cl.
CPC .......... *H04L 67/104* (2013.01); *H04L 61/2007* (2013.01); *H04L 61/25* (2013.01); *H04L 61/2589* (2013.01); *H04L 65/1073* (2013.01); *H04L 61/2514* (2013.01)

(58) Field of Classification Search
CPC ... H04L 67/104; H04L 61/2007; H04L 61/25; H04L 61/2589; H04L 61/2514; H04L 65/1073
USPC ......... 709/203, 206, 217, 220, 223, 224, 227, 709/228
See application file for complete search history.

(56) References Cited

U.S. PATENT DOCUMENTS

| | | | | |
|---|---|---|---|---|
| 7,590,758 | B2 * | 9/2009 | Takeda | H04L 29/12066 709/220 |
| 8,832,251 | B2 * | 9/2014 | George | H04L 61/2564 709/203 |
| 2010/0146053 | A1 * | 6/2010 | Jiang | H04L 29/125 709/204 |

* cited by examiner

*Primary Examiner* — Viet Vu
(74) *Attorney, Agent, or Firm* — Bacon & Thomas, PLLC

(57) ABSTRACT

The present invention is to provide a method for enabling a tracker/coordinator in a P2P system to receive server address queries from network devices through Internet; provide address of a protocol server to the network devices according to the server address queries, so as for the network devices to conduct NAT behavior tests on NAT routers connected therewith through the protocol server; assigning a first network device with the router incapable of forwarding messages to a second network device with the router capable of forwarding messages according to the test results; providing a mapped address of a port of the second network device to a third network device, when receiving a port query from the third network device and determining that the port query corresponds to the first network device, so as for the third network device to directly connect with the first network device through the second network device.

7 Claims, 5 Drawing Sheets

METHOD FOR EXCHANGING NETWORK MESSAGES IN DISTRIBUTED MANNER

FIELD OF THE INVENTION

The present invention relates to exchanging network messages, more particularly to a method applied to a peer-to-peer (P2P) network system for exchanging network messages in a distributed manner, which enables a tracker/coordinator in the system to perform steps included in the method, so as to allow a third network device to directly connect with a first network device having a first NAT router incapable of forwarding messages through a second network device having a second NAT router capable of forwarding messages.

BACKGROUND OF THE INVENTION

With the development and advancement of communication technologies, network-related applications have become a part of our daily lives. For example, the rapidly growing peer-to-peer (P2P) networking technique enables a user to directly connect with another user over a P2P network so that voice chat, video transmission, or data sharing and exchange can be carried out.

In today's P2P networking environment, if one of two endpoints (i.e., network devices) respectively located behind different Network Address Translators (NATs) intends to send a message (e.g., a control message) to the other endpoint, the former endpoint must begin by contacting a tracker/coordinator to inquire about the address of the latter endpoint. Once the address is obtained, the former endpoint sends the message to the latter endpoint with the assistance of a protocol server (e.g., a STUN server, wherein STUN stands for Session Traversal Utilities for Network Address Translation) located in a public network. For example, a network device Host A is located behind a NAT router NAT X, a network device Host B is located behind a NAT router NAT Y, and a protocol server and a tracker/coordinator are located in a public network. When Host A intends to send a message to Host B, it is required that Host A send a first query request to the tracker/coordinator first. Based on the first query request, the tracker/coordinator sends a query response to Host A, wherein the query response indicates a second mapped address of Host B in NAT Y. After receiving the query response containing the second mapped address, Host A sends the message for Host B to the protocol server along with a first mapped address of Host A and the second mapped address. The protocol server then forwards the message and the first mapped address of Host A to the second mapped address of Host B in NAT Y, so as for NAT Y to relay the message to Host B. If Host B having received the message wishes to send a second message to Host A in reply, Host B must send the second message, the second mapped address, and the first mapped address to the protocol server, in order for the protocol server to forward the second message and the second mapped address to the first mapped address of Host A in NAT X, and consequently for NAT X to relay the second message to Host A.

The foregoing processes clearly show that, if two network devices respectively located behind different NATs are to communicate with each other, all the messages must be forwarded via a protocol server. Now that more and more people use P2P networks, the workload of such protocol servers is bound to increase. Further, should a protocol server fail to operate properly, all commands or control messages which are supposed to be forwarded by the protocol server between different endpoints will have problem reaching their destinations, and the P2P network in question will be down as a result. The issue to be addressed by the present invention, therefore, is to design a method for exchanging network messages in a distributed manner so that the work of message transmission in a P2P network system is not centralized in a protocol server.

BRIEF SUMMARY OF THE INVENTION

In a conventional P2P network system, endpoints respectively located behind different NAT routers cannot communicate with one another without a protocol server to help forward messages. Such dependence on the assistance of a protocol server, however, adds significantly to the workload of the protocol server in use and may lead to other problems as well. In view of this, the inventor of the present invention developed a method for exchanging network messages in a distributed manner in which endpoints capable of forwarding messages in a P2P network system are called for to help those incapable of such to forward messages. The present invention is intended to reduce the workload of a protocol server in a P2P network system by changing the way messages are transmitted in the P2P network system.

It is an object of the present invention to provide a method for exchanging network messages in a distributed manner, wherein the method is applicable to a peer-to-peer (P2P) network system which at least includes a first network terminal, a second network terminal, a third network terminal, a tracker/coordinator, and a protocol server (e.g., a STUN server, wherein STUN is short for Session Traversal Utilities for Network Address Translation). The first network terminal includes a first network device (or host) and a first Network Address Translator (NAT) router. The first network device can connect to the Internet via the first NAT router. The second network terminal includes a second network device and a second NAT router through which the second network device can connect to the Internet. The third network terminal includes a third network device and a third NAT router through which the third network device can connect to the Internet. The tracker/coordinator and the protocol server are located in a public network. The first NAT router is not capable of forwarding messages, but the second NAT router is. The method includes the following steps to be performed by the tracker/coordinator. To begin with, the tracker/coordinator receives through the Internet a server address query request sent by the first or the second network device. Then, the tracker/coordinator provides the address of the protocol server to the first or the second network device according to the server address query request, so as for the first or the second network device to connect to and communicate with the protocol server through the Internet and conduct NAT behavior tests on the first or the second NAT router through the protocol server. After the first network device determines, according to responses of the protocol server, that the first NAT router is incapable of forwarding messages and after the first network device opens a first device port, the tracker/coordinator receives a first registration request sent by the first network device. Based on the first registration request, the tracker/coordinator records a first mapped address of the first device port as a first service port, wherein the first mapped address corresponds to the first NAT router. The tracker/coordinator also records that the first NAT router is incapable of forwarding messages. Similarly, after the second network device determines, according to responses of the protocol server, that the second NAT router is capable of forwarding messages and after the second network device opens a second device port, the tracker/coordinator receives a second registration request sent by the second network device. Based on the second registration request, the tracker/coordinator records a second mapped address of the second device port as a second service port, wherein the second mapped address corresponds to the second NAT router. The tracker/coordinator also records that the second NAT router is capable of forwarding messages. Then, the tracker/coordinator receives a forwarding request of the first network terminal and, according to the forwarding request, sends a first assignment message to the first network device. The first assignment message includes identification information of the second network device so that the first network device can send an assignment confirmation request to the second network device through the second NAT router according to the first assignment message. The tracker/coordinator also sends a second assignment message to the second network device according to the forwarding request, wherein the second assignment message includes identification information of the first network device so that the second network device can, upon receiving the assignment confirmation request, send an assignment confirmation reply to the first network device through the first NAT router according to the second assignment message, thereby establishing a direct connection between the first and the second network terminals. The tracker/coordinator further records the assignment relationship between the first network device and the second network device according to the forwarding request. Afterward, the tracker/coordinator receives a service port query request of the third network device and determines which network device corresponds to the service port query request. If it is determined that the network device corresponding to the service port query request is the first network device, the tracker/coordinator provides the second service port of the second network device to the third network device according to the aforesaid assignment relationship, thus allowing the third network device to send a message to the second network device through the second service port, and the second network device to forward the message to the first network device. If it is determined that the network device corresponding to the service port query request is the second network device, the tracker/coordinator provides the second service port of the second network device to the third network device according to the second registration request, thus allowing the third network device to directly connect to the second network device through the second service port.

The present invention provides an improvement over the prior art in that, when network devices respectively located behind different NAT routers in a P2P network system are to communicate with one another, messages need not be forwarded by a protocol server (e.g., a STUN server) in the P2P network system, meaning the protocol server is relieved of an otherwise heavy workload. Thus, the P2P network system is also prevented from a total breakdown which may otherwise occur if the protocol server is required to but fail to provide forwarding services. More particularly, the method of the present invention serves to identify any network terminal in the P2P network system that is capable of forwarding messages, so as for such a network terminal to assist in message transmission and thereby effectively reduce the workload of the protocol server. In addition to reducing the workload of the protocol server, the present invention can lower maintenance cost as well as setup cost and help endpoints with NAT traversal and transmission of control messages.

BRIEF DESCRIPTION OF THE SEVERAL VIEWS OF THE DRAWINGS

The objects, technical features, and effects of the present invention will be best understood by referring to the following detailed description of some illustrative embodiments in conjunction with the accompanying drawings, in which.

DETAILED DESCRIPTION OF THE INVENTION

Figure 1:
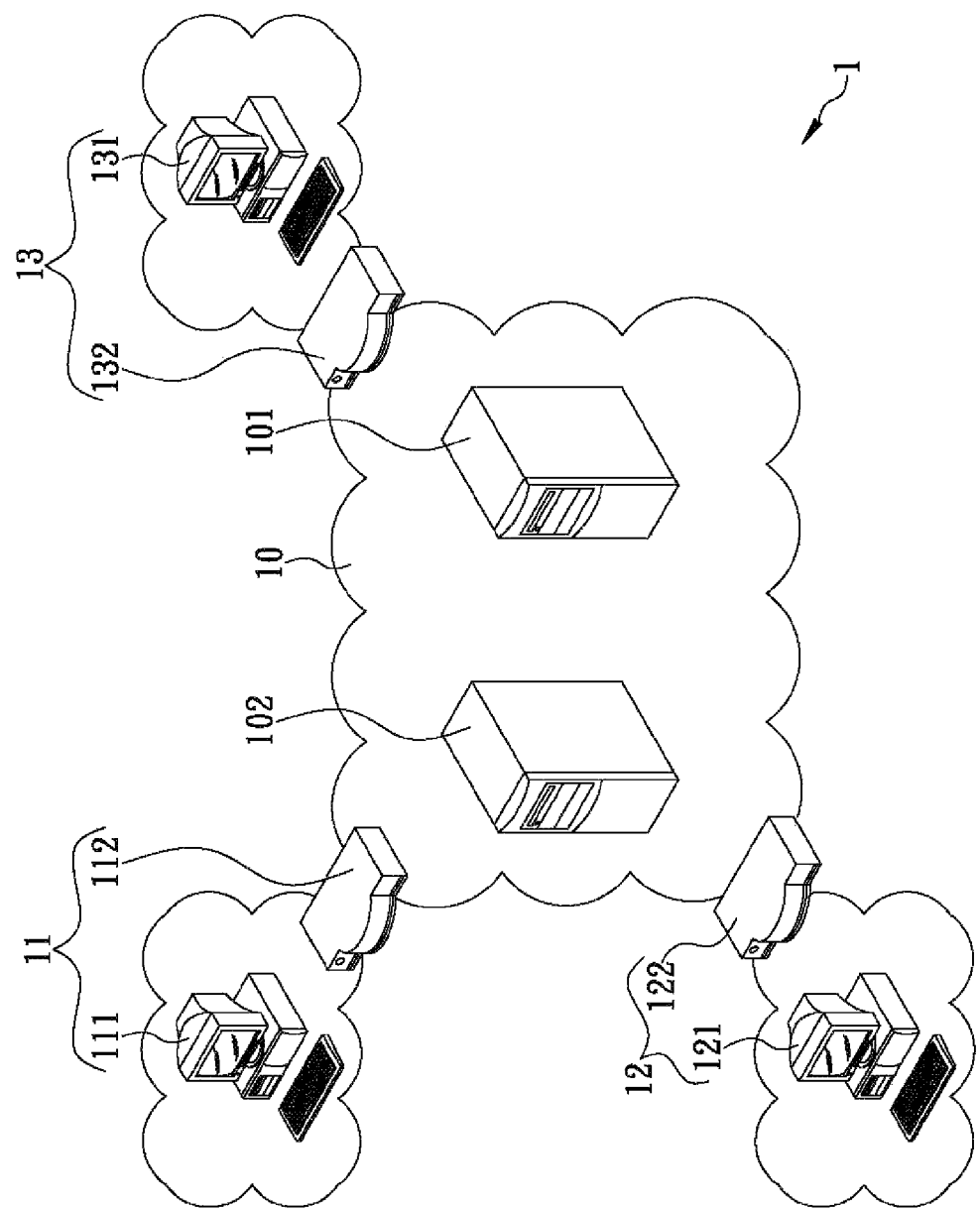
FIG. 1 is a structural diagram of a simplified model of a P2P network system employing the present invention.

The present invention discloses a method for exchanging network messages in a distributed manner. The method is applicable to a peer-to-peer (or P2P for short) network system so that network devices respectively located behind different Network Address Translator (NAT) routers in the P2P network system can communicate with one another by the method. Referring to FIG. 1, a simplified model of a preferred embodiment of the present invention illustrates the structure of a P2P network system 1 and how the method of the present invention works within the structure. The P2P network system 1 at least includes a first network terminal 11, a second network terminal 12, a third network terminal 13, a tracker/coordinator 101, and a protocol server 102, the latter two of which are located in the Internet 10. The tracker/coordinator 101 may be a tracker or coordinator configured for tracking connections between nodes. The protocol server 102 may be a STUN (Session Traversal Utilities for Network Address Translation) server, which allows a network device behind a NAT router to find its own public address, to determine the type of the NAT router, and to obtain such information as the Internet port of the NAT router that is bound to a local port. With the aforesaid information, two network devices respectively located behind different NAT routers can communicate with each other via UDP (User Datagram Protocol).

As shown in FIG. 1, the first network terminal 11 includes a first network device 111 and a first NAT router 112. The first network device 111 is located in the private network created by the first NAT router 112. In this embodiment, the first network device 111 has a first device IP (Internet Protocol) address IPa and opens a first device port Pa for the first device IP address. Likewise, the first NAT router 112 has a first router IP address IPx and opens a first router port Px for the first router IP address. The first network device 111 can connect to the Internet 10 through the first NAT router 112. The second network terminal 12 includes a second network device 121 and a second NAT router 122. The second network device 121 is located in another private network, which is created by the second NAT router 122. In this embodiment, the second network device 121 has a second device IP address IPb and opens a second device port Pb for the second device IP address, and the second NAT router 122 has a second router IP address IPy and opens a second router port Py for the second router IP address. The second network device 121 can connect to the Internet 10 through the second NAT router 122. The third network terminal 13 includes a third network device 131 and a third NAT router 132. The third network device 131 is located in yet another private network, which is created by the third NAT router 132. In this embodiment, the third network device 131 has a third device IP address IPc and opens a third device port Pc for the third device IP address, and the third NAT router 132 has a third router IP address IPz and opens a third router port Pz for the third router IP address. The third network device 131 can connect to the Internet 10 through the third NAT router 132. In this embodiment, the first NAT router 112 is incapable of forwarding messages whereas the second NAT router 122 is capable of forwarding messages.

In this preferred embodiment, the tracker/coordinator 101 is a tracker or a coordinator, and the protocol server 102 is a STUN server. The tracker/coordinator 101 has a network interface with the transmission address IPt, wherein IPt opens a socket using the port Pt. The protocol server 102, on the other hand, has a network interface with at least a first server IP address and a second server IP address. In this embodiment, the first and the second server IP addresses are IPs1 and IPs2 respectively. IPs1 opens a first server port Ps11 and a second server port Ps12, and IPs2 opens a third server port Ps21. When receiving a server address query request sent by any of the network devices, the tracker/coordinator 101 provides the first, the second, and the third server ports IPs1.Ps11, IPs1.Ps12, and IPs2.Ps21 of the protocol server 102 to the network device which has sent the server address query request, thus enabling the network device to conduct NAT behavior tests on the corresponding NAT router through the protocol server 102. In this preferred embodiment, each of the first and the second network devices 111 and 121 can conduct a NAT mapping behavior test and a NAT filtering behavior test on the corresponding first or second NAT router 112 or 122 through the protocol server 102.

Figure 2:
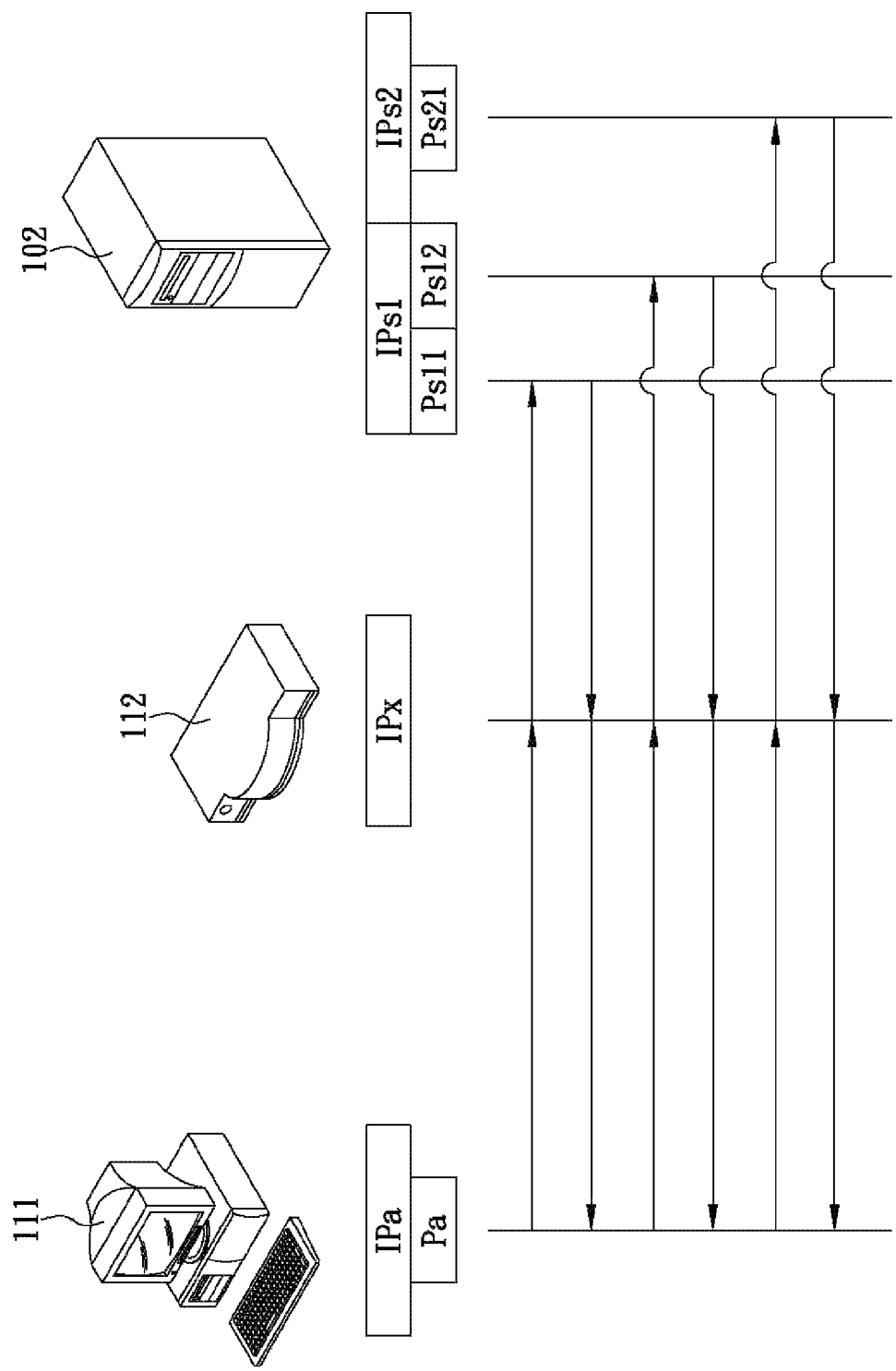
FIG. 2 is a time sequence diagram showing how a network device conducts a NAT mapping behavior test through a protocol server.

The process of the NAT mapping behavior test and the criteria according to which the type of a NAT mapping behavior is determined are described below with reference to the first network device 111 by way of example. In this embodiment, referring to FIG. 2, the first network device 111 sends a first binding request, a second binding request, and a third binding request to the protocol server 102 through the first NAT router 112. More specifically, the first binding request is sent to the first server port IPs1.Ps11 of the protocol server 102, the second binding request is sent to the second server port IPs1.Ps12 of the protocol server 102, and the third binding request is sent to the third server port IPs2.Ps21 of the protocol server 102. In reply, the protocol server 102 sends a first binding response from the first server port to the first network device 111 according to the first binding request, a second binding response from the second server port to the first network device 111 according to the second binding request, and a third binding response from the third server port to the first network device 111 according to the third binding request. Each of the first, the second, and the third binding responses records the IP address of, and the port opened by, the first NAT router 112, and the first network device 111 can determine the type of the NAT mapping behavior of the first NAT router 112 based on the ports recorded in the first, the second, and the third binding responses. More particularly, the first network device 111 compares the ports recorded in the first, the second, and the third binding responses and determines the NAT mapping behavior of the first NAT router 112 as independent if the ports recorded in the first, the second, and the third binding responses are the same; as address-dependent if the ports recorded in the first and the second binding responses are the same but are different from the port recorded in the third binding response; or as address and port-dependent if the ports recorded in the first, the second, and the third binding responses are all different.

Figure 3:
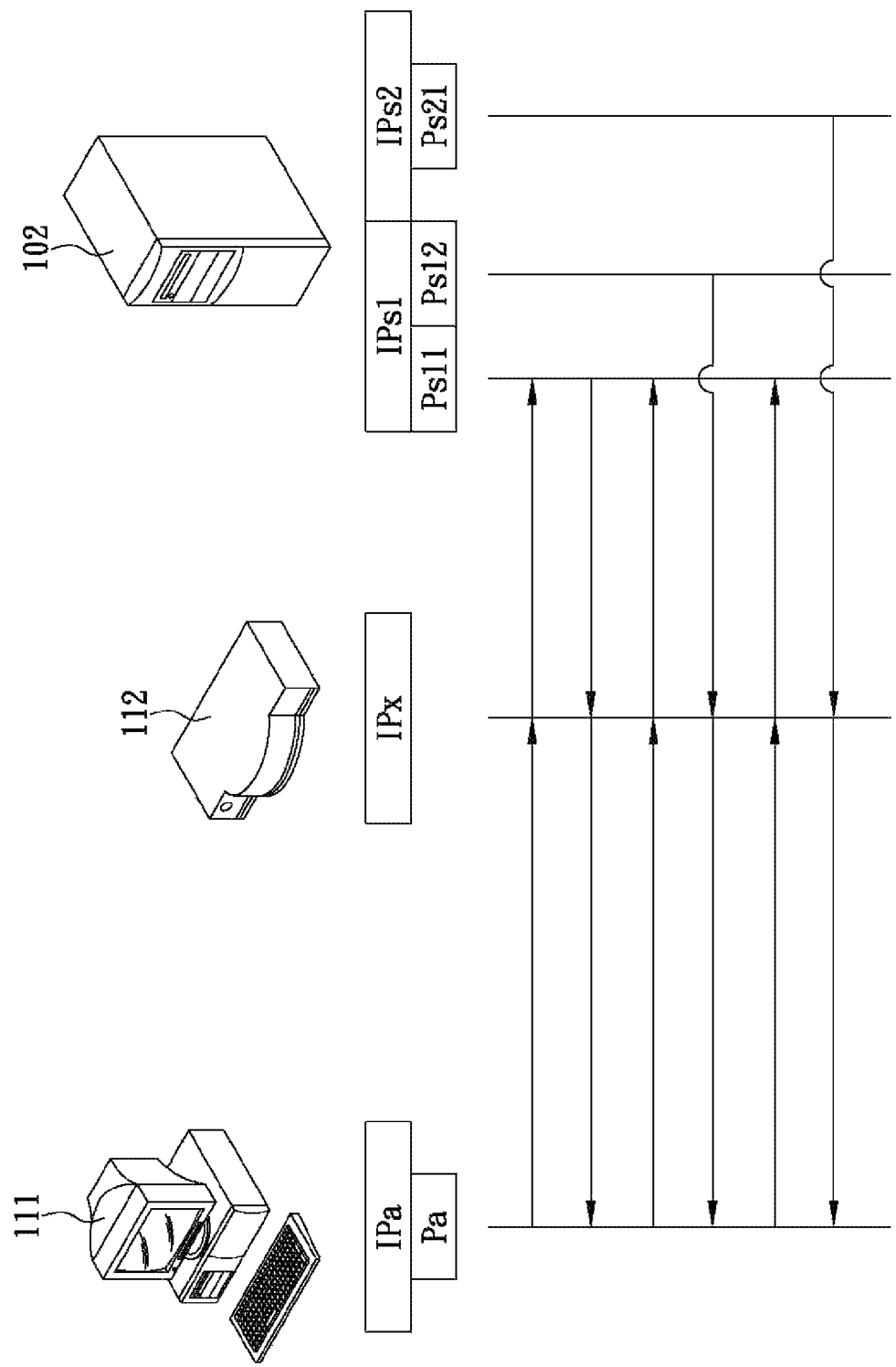
FIG. 3 is a time sequence diagram showing how a network device conducts a NAT filtering behavior test through a protocol server.

The process of the NAT filtering behavior test and the criteria according to which the type of a NAT filtering behavior is determined are described below also with reference to the first network device 111 by way of example. In this embodiment, referring to FIG. 3, the first network device 111 sends a fourth binding request, a fifth binding request, and a sixth binding request to the first server port of the protocol server 102 through the first NAT router 112. The fifth binding request has a first CHANGE-REQUEST attribute including a "change port" flag, so the protocol server 102, acting according to the first CHANGE-REQUEST attribute, changes the server port from which the corresponding binding response is to be sent. In this embodiment, the protocol server 102 receives the fifth binding request through the first server port IPs1.Ps11 but sends a fifth binding response to the first network device 111 through the second server port IPs1.Ps12 instead, wherein both the first server port IPs1.Ps11 and the second server port IPs1.Ps12 are server ports opened for the first server IP address IPs1. (That is to say, only the port is changed, but the IP address is not.) The sixth binding request, on the other hand, has a second CHANGE-REQUEST attribute including a "change IP" flag, so the protocol server 102, acting according to the second CHANGE-REQUEST attribute, changes the server IP address from which the corresponding binding response is to be sent. In this embodiment, in which the first server port IPs1.Ps11 and the third server port IPs2.Ps21 are opened for the first server IP address IPs1 and the second server IP address IPs2 respectively, the protocol server 102 receives the sixth binding request through the first server port IPs1.Ps11 but sends a sixth binding response to the first network device 111 through the third server port IPs2.Ps21 instead.

Continued from the above, the first network device 111 determines the type of the NAT filtering behavior of the first NAT router 112 according to receipt conditions of the fourth, the fifth, and the sixth binding responses. If the fourth, the fifth, and the sixth binding responses are all successfully delivered to the first network device 111, the first network device 111 will determine the NAT filtering behavior of the first NAT router 112 as independent. If the fourth and the fifth binding responses are successfully delivered to the first network device 111 but the sixth binding response is not, the NAT filtering behavior of the first NAT router 112 will be determined as address-dependent. If the fourth binding response is successfully delivered to the first network device 111 but the fifth and the sixth binding responses are not, the NAT filtering behavior of the first NAT router 112 will be determined as address and port-dependent.

Referring back to FIG. 2 and FIG. 3, if both the NAT mapping behavior and the NAT filtering behavior of the first NAT router 112 are independent, the first NAT router 112 is a full-cone NAT, meaning the first NAT router 112 is capable of forwarding messages. If either of the NAT mapping behavior and the NAT filtering behavior of the first NAT router 112 is not independent (i.e., if either the NAT mapping behavior or the NAT filtering behavior is address-dependent or address and port-dependent), the first NAT router 112 is not a full-cone NAT, meaning the first NAT router 112 is incapable of forwarding messages. The NAT mapping behavior test and the NAT filtering behavior test to be conducted on the second NAT router 122 (see FIG. 1) are identical to those conducted on the first NAT router 112 and therefore will not be described repeatedly. In the present embodiment, as stated previously, the first NAT router 112 is incapable of forwarding messages, but the second NAT router 122 is capable of forwarding messages.

Referring back to FIG. 1, once the first network device 111 determines, according to the responses of the protocol server 102, that the first NAT router 112 is incapable of forwarding messages, the first network device 111 opens the first device port and sends a first registration request to the tracker/coordinator 101 through the first NAT router 112, wherein the first registration request includes a first mapped address of the first network device 111 that corresponds to the first NAT router 112. In this embodiment, the first registration request further includes the information that the first NAT router 112 is incapable of forwarding messages. Thus, when receiving the first registration request sent by the first network device 111, the tracker/coordinator 101 will, according to the first registration request, not only record the first mapped address of the first network device 111 as a first service port, but also record that the first NAT router 112 is incapable of forwarding messages. By the same token, when the tracker/coordinator 101 receives a second registration request sent by the second network device 121, the tracker/coordinator 101 will, according to the second registration request, record a second mapped address, which corresponds to the second device port of the second network device 121, as a second service port and record that the second NAT router 122 is capable of forwarding messages.

After sending the first registration request to the tracker/coordinator 101, the first network device 111 further sends a forwarding request to the tracker/coordinator 101 through the first NAT router 112 due to the fact that the first NAT router 112 is incapable of forwarding messages. The tracker/coordinator 101 receives the forwarding request and, based on the information recorded in the tracker/coordinator 101, assigns to the first network device 111 a network device which is located behind a NAT router capable of forwarding messages. In this embodiment, the tracker/coordinator 101 having received the forwarding request will find from the information recorded in the tracker/coordinator 101 that the second NAT router 122 is capable of forwarding messages; hence, the tracker/coordinator 101 will assign the second network device 121 to the first network device 111. The tracker/coordinator 101 will also record the assignment relationship between the first network device 111 and the second network device 121 according to the forwarding request.

The steps to be performed by the tracker/coordinator 101 after receiving the forwarding request are detailed as follows. Upon receiving the forwarding request, the tracker/coordinator 101 sends a first assignment message to the first NAT router 112 according to the forwarding request. The first NAT router 112 then relays the first assignment message to the first network device 111. The tracker/coordinator 101 also sends a second assignment message to the second NAT router 122 according to the forwarding message, and the second assignment message is relayed to the second network device 121 by the second NAT router 122. The first assignment message includes identification information of the second network device 121, which information not only informs the first network device 111 that the network device assigned to help forward messages for it is the second network device 121, but also enables the first network device 111 to send an assignment confirmation request to the second network device 121 behind the second NAT router 122 according to the first assignment message. The second assignment request, on the other hand, includes identification information of the first network device 111 so that not only is the second network device 121 notified of its being assigned to help forward messages for the first network device 111, but also the second network device 121 is enabled to send an assignment confirmation reply to the first NAT router 112 according to the second assignment message after receiving the assignment confirmation request. The assignment confirmation reply will be relayed to the first network device 111 by the first NAT router 112 such that a direct connection is established between the first and the second network terminals 11 and 12.

Referring to FIG. 1, the method of the present invention is so designed that, when the third network device 131 is to exchange messages with the first network device 111, the second network device 121 will provide assistance to enable communication between the first and the third network devices 111 and 131. The following example shows how the third network device 131 sends a message to the first network device 111, or more particularly, how the second network device 121 assists the third network device 131 in communicating with the first network device 111. To begin with, the third network device 131 sends a service port query request to the tracker/coordinator 101 through the third NAT router 132. In this embodiment, the network device corresponding to the service port query request is the first network device 111, but the tracker/coordinator 101, upon receiving the service port query request, will provide the second service port to the third network device 131 according to the assignment relationship recorded in the tracker/coordinator 101. Thus, when the third network device 131 sends out a message intended for the first network device 111, the message is sent to the second NAT router 122 through the second service port, and the second NAT router 122 relays the message to the second network device 121. After receiving the message sent by the third network device 131, the second network device 121 determines, according to the content of the message, that the message is in fact intended for the first network device 111; therefore, the second network device 121 forwards the message to the first NAT router 112. The first NAT router 112 then relays the message to the first network device 111, thereby concluding the message transmission process.

When the third network device 131 is to exchange messages with the second network device 121 instead, the third network device 131 sends a second service port query request to the tracker/coordinator 101 through the third NAT router 132, wherein the second service port query request corresponds to the second network device 121. As the second NAT router 122 itself is capable of forwarding messages, the tracker/coordinator 101 will directly provide the second service port to the third network device 131 after receiving the second service port query request. Thus, when the third network device 131 sends out a second message intended for the second network device 121, the second message is sent to the second NAT router 122 through the second service port, and the second NAT router 122 relays the received second message to the second network device 121. After receiving the second message sent by the third network device 131, the second network device 121 determines that the network device with which the third network device 131 intends to communicate is no other than the second network device 121 itself, so the second message will not be further forwarded. Transmission of the second message is thus completed.

Figure 4A:
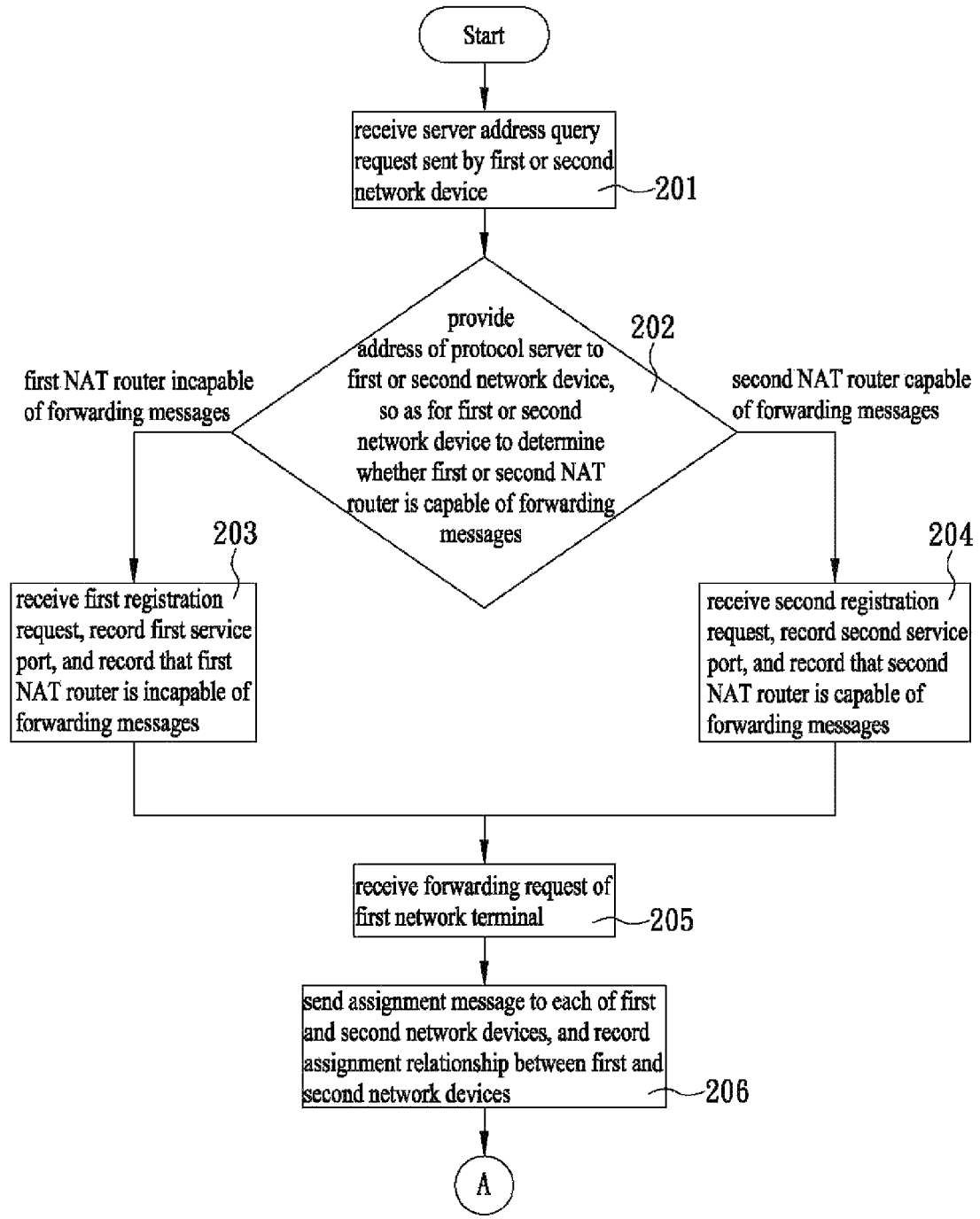
FIG. 4A is a flowchart showing how a tracker/coordinator in the present invention establishes an assignment relationship between network terminals.
Figure 4B:
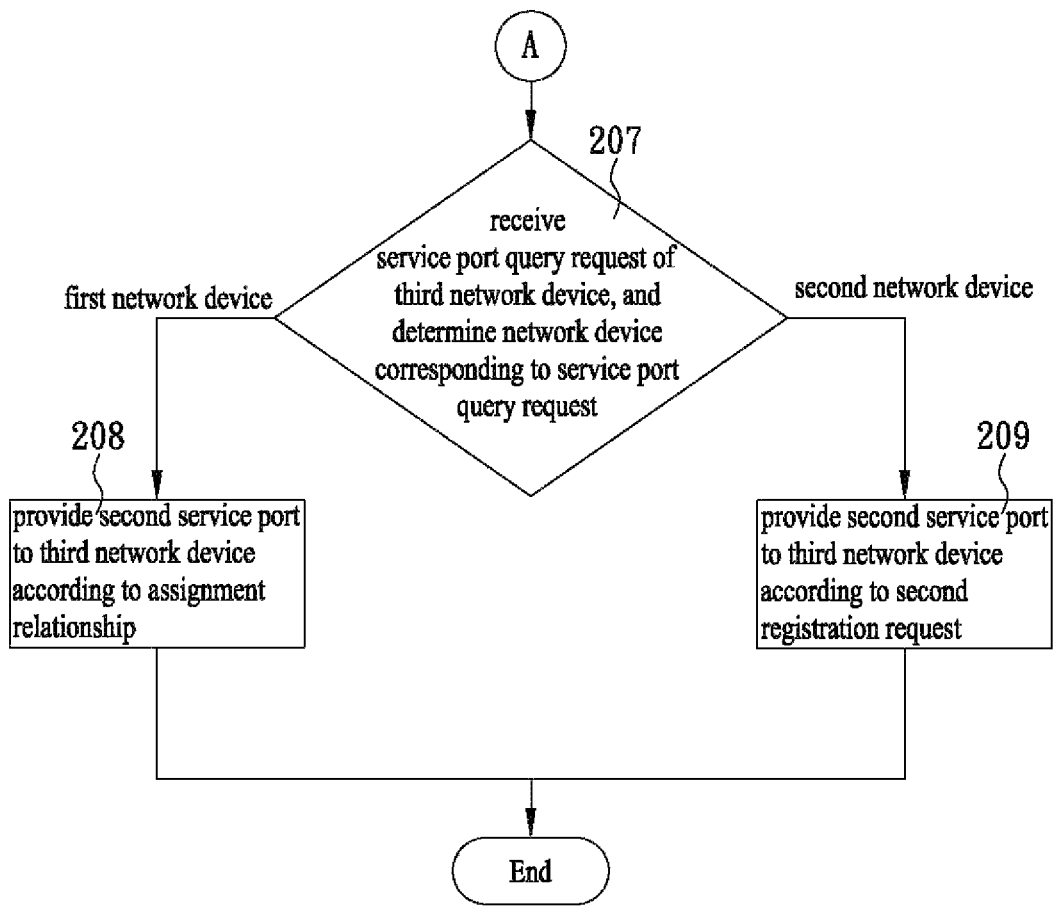
FIG. 4B is a flowchart showing how the tracker/coordinator in the present invention assists a network terminal in transmitting a message.

The structure of the P2P network system 1 and how the method of the present invention works within the structure have been described in detail by means of a simplified model of the preferred embodiment of the present invention. To shed more light on the process flow of the present invention, a step-by-step description is given below with reference to the flowcharts in FIG. 4A and FIG. 4B. The reference numerals in FIG. 1 still apply. As shown in the flowcharts, the main process of the present invention includes the following steps to be performed by the tracker/coordinator 101:

(201) The tracker/coordinator 101 receives, through the Internet 10, a server address query request sent by the first or the second network device 111 or 121.

(202) According to the server address query request, the tracker/coordinator 101 provides the address of the protocol server 102 to the first or the second network device 111 or 121, allowing the first or the second network device 111 or 121 to connect to and communicate with the protocol server 102 through the Internet 10 and then conduct NAT behavior tests on the first or the second NAT router 112 or 122 via the protocol server 102. If the first network device 111 determines that the first NAT router 112 is incapable of forwarding messages, step (203) is performed; if the second network device 121 determines that the second NAT router 122 is capable of forwarding messages, step (204) is performed.

(203) After the first network device 111 opens a first device port, the tracker/coordinator 101 receives a first registration request sent by the first network device 111. According to the first registration request, the tracker/coordinator 101 records a first mapped address of the first device port as a first service port, wherein the first mapped address corresponds to the first NAT router 112. The tracker/coordinator 101 also records that the first NAT router 112 is incapable of forwarding messages.

(204) After the second network device 121 opens a second device port, the tracker/coordinator 101 receives a second registration request sent by the second network device 121. According to the second registration request, the tracker/coordinator 101 records a second mapped address of the second device port as a second service port, wherein the second mapped address corresponds to the second NAT router 122. The tracker/coordinator 101 also records that the second NAT router 122 is capable of forwarding messages.

(205) The tracker/coordinator 101 receives a forwarding request of the first network terminal 11.

(206) According to the forwarding request, the tracker/coordinator 101 sends a first assignment message to the first network device 111, sends a second assignment message to the second network device 121, and records the assignment relationship between the first network device 111 and the second network device 121.

(207) The tracker/coordinator 101 receives a service port query request of the third network device 131 and determines the network device corresponding to the service port query request. Step (208) is performed if the network device corresponding to service port query request is the first network device 111, or step (209) is performed if the network device corresponding to the service port query request is the second network device 121.

(208) According to the assignment relationship, the tracker/coordinator 101 provides the second service port to the third network device 131, so as for the third network device 131 to send a message to the second network device 121 through the second service port, and for the second network device 121 to forward the message to the first network device 111.

(209) According to the second registration request, the tracker/coordinator 101 provides the second service port to the third network device 131, so as for the third network device 131 to directly connect to the second network device 121 through the second service port.

In steps (201) and (202), the tracker/coordinator 101 helps the first or the second network device 111 or 121 communicate with the protocol server 102, thus enabling the first or the second network device 111 or 121 to conduct NAT behavior tests on the first or the second NAT router 112 or 122 via the protocol server 102. The NAT behavior tests conducted in step (202) by the first or the second network device 111 or 121 on the first or the second NAT router 112 or 122 include a NAT mapping behavior test and a NAT filtering behavior test. If, based on the NAT behavior test results, either the NAT mapping behavior or the NAT filtering behavior is not independent, the first or the second NAT router 112 or 122 under test will be determined as a NAT router incapable of forwarding messages. In this embodiment, in which the first NAT router 112 is incapable of forwarding messages, the tracker/coordinator 101 records the first NAT router 112 as such when receiving the first registration request of the first network device 111 in step (203). The second NAT router 122, on the other hand, is capable of forwarding messages, so the tracker/coordinator 101 records the second NAT router 122 as such when receiving the second registration request of the second network device 121 in step (204). Now that the first NAT router 112 is incapable of forwarding messages, the tracker/coordinator 101 in steps (205) and (206) will, according to the forwarding request of the first network terminal 11, assign to the first network terminal 11 a network terminal capable of forwarding messages (i.e., a network terminal whose NAT router is capable of forwarding messages) and record the assignment relationship therebetween. Once the assignment is completed, and the third network device 131 of the third network terminal 13 intends to send a message to the first network device 111, the tracker/coordinator 101 in steps (207) and (208) will, according to the assignment relationship, instruct the second network terminal 12, which is capable of forwarding messages, to help forward the message. If the third network device 131 intends to send a second message to the second network device 121, the tracker/coordinator 101 in step (209) will help the third network device 131 to directly connect to the second network device 121. Therefore, aside from assisting the first or the second network device 111 or 121 in conducting the NAT behavior tests on the first or the second NAT router 112 or 122, the protocol server 102 does not have to provide assistance each time a message is to be transmitted. The workload of the protocol server 102 is thus substantially reduced.

In summary, the method of the present invention serves to determine which network terminal in the P2P network system 1 is capable of forwarding messages, and then the work of forwarding messages is distributed to that network terminal, so as for the network terminal capable of forwarding messages to help a network terminal incapable of such to transmit messages. Unlike prior art methods, according to which all messages to be transmitted between two network devices respectively located behind different NATs in the P2P network system 1 must be forwarded by the protocol server 102, the present invention is obviously effective in reducing the workload of the protocol server 102. Moreover, the present invention prevents the P2P network system 1 from breaking down entirely and instantly should the protocol server 102 fail to work properly.

While the invention herein disclosed has been described by means of specific embodiments, numerous modifications and variations could be made thereto by those skilled in the art without departing from the scope of the invention set forth in the claims.

What is claimed is:

1. A method for exchanging network messages in a distributed manner, the method being applicable to a peer-to-peer (P2P) network system comprising a first network terminal, a second network terminal, a third network terminal, a tracker/coordinator, and a protocol server, the first network terminal comprising a first network device and a first Network Address Translator (NAT) router through which the first network device is connectable to the Internet, the second network terminal comprising a second network device and a second NAT router through which the second network device is connectable to the Internet, the third network terminal comprising a third network device and a third NAT router through which the third network device is connectable to the Internet, the tracker/coordinator and the protocol server being located in a public network, the first NAT router being incapable of forwarding messages, the second NAT router being capable of forwarding messages, the method comprising the steps, to be performed by the tracker/coordinator, of:

receiving through the Internet a server address query request sent by the first or the second network device;

providing an address of the protocol server to the first or the second network device according to the server address query request, for enabling the first or the second network device to connect to and communicate with the protocol server through the Internet and conduct NAT behavior tests on the first or the second NAT router through the protocol server;

receiving a first registration request sent by the first network device after the first network device has determined, according to responses of the protocol server, that the first NAT router is incapable of forwarding messages and after the first network device has opened a first device port; recording a first mapped address of the first device port as a first service port according to the first registration request, wherein the first mapped address corresponds to the first NAT router; and recording that the first NAT router is incapable of forwarding messages;

receiving a second registration request sent by the second network device after the second network device has determined, according to responses of the protocol server, that the second NAT router is capable of forwarding messages and after the second network device has opened a second device port; recording a second mapped address of the second device port as a second service port according to the second registration request, wherein the second mapped address corresponds to the second NAT router; and recording that the second NAT router is capable of forwarding messages;

receiving a forwarding request of the first network terminal;

sending a first assignment message to the first network device according to the forwarding request, the first assignment message including identification information of the second network device for enabling the first network device to send an assignment confirmation request to the second network device through the second NAT router according to the first assignment message;

sending a second assignment message to the second network device according to the forwarding request, the second assignment message including identification information of the first network device for enabling the second network device to send, after receiving the assignment confirmation request, an assignment confirmation reply to the first network device through the first NAT router according to the second assignment message, thereby establishing a direct connection between the first and the second network terminals;

recording an assignment relationship between the first network device and the second network device according to the forwarding request;

receiving a service port query request of the third network device and determining which said network device corresponds to the service port query request;

providing the second service port of the second network device to the third network device according to the assignment relationship if it is determined that the first network device corresponds to the service port query request, for enabling the third network device to send a message to the second network device through the second service port, and for the second network device to forward the message to the first network device; and providing the second service port of the second network device to the third network device according to the second registration request if it is determined that the second network device corresponds to the service port query request, for enabling the third network device to directly connect to the second network device through the second service port.

2. The method of claim 1, wherein:
the tracker/coordinator is a tracker or a coordinator; and
the protocol server is a STUN (Session Traversal Utilities for Network Address Translation) server.

3. The method of claim 2, wherein the protocol server has a network interface comprising a first server IP (Internet Protocol) address and a second server IP address, the first server IP address opening at least a first server port and a second server port, the second server IP address opening at least a third server port, the method further comprising the steps, to be performed by the first or the second network device, of:

sending a plurality of binding requests to the protocol server through the first or the second NAT router; and receiving a plurality of binding responses sent by the protocol server from the first, the second, or the third server port, in order to conduct a NAT mapping behavior test and a NAT filtering behavior test.

4. The method of claim 3, further comprising the steps, to be performed by the first or the second network device in order to conduct the NAT mapping behavior test on the first or the second NAT router, of;

sending a first binding request to the first server port through the first or the second NAT router and receiving a first binding response sent from the first server port;

sending a second binding request to the second server port through the first or the second NAT router and receiving a second binding response sent from the second server port; and sending a third binding request to the third server port through the first or the second NAT router and receiving a third binding response sent from the third server port, wherein the first, the second, and the third binding responses each record an IP address of, and a port opened by, the first or the second NAT router, thus enabling the first or the second network device to determine a type of a NAT mapping behavior of the first or the second NAT router according to the ports recorded in the first, the second, and the third binding responses.

5. The method of claim 4, wherein the first or the second network device determines the type of the NAT mapping behavior of the NAT router according to the following criteria:

the NAT mapping behavior of the first or the second NAT router is determined as independent if the ports recorded in the first, the second, and the third binding responses are identical;

the NAT mapping behavior of the first or the second NAT router is determined as address-dependent if the ports recorded in the first and the second binding responses are identical but are different from the port recorded in the third binding response; and the NAT mapping behavior of the first or the second NAT router is determined as address and port-dependent if the ports recorded in the first, the second, and the third binding responses are all different.

6. The method of claim 3, further comprising the steps, to be performed by the first or the second network device in order to conduct the NAT filtering behavior test on the first or the second NAT router, of:

sending a fourth binding request to the first server port through the first or the second NAT router, for enabling the protocol server to send back a fourth binding response from the first server port;

sending a fifth binding request to the first server port through the first or the second NAT router, wherein the fifth binding request has a first CHANGE-REQUEST attribute including a "change port" flag for enabling the protocol server to send back a fifth binding response from the second server port instead according to the first CHANGE-REQUEST attribute;

sending a sixth binding request to the first server port through the first or the second NAT router, wherein the sixth binding request has a second CHANGE-REQUEST attribute including a "change IP" flag for enabling the protocol server to send back a sixth binding response from the third server port instead according to the second CHANGE-REQUEST attribute; and determining a type of a NAT filtering behavior of the first or the second NAT router according to receipt conditions of the fourth, the fifth, and the sixth binding responses.

7. The method of claim 6, wherein the first or the second network device determines the type of the NAT filtering behavior of the NAT router according to the following criteria:

the NAT filtering behavior of the first or the second NAT router is determined as independent if the fourth, the fifth, and the sixth binding responses are received;

the NAT filtering behavior of the first or the second NAT router is determined as address-dependent if the fourth and the fifth binding responses are received but the sixth binding response is not received; and the NAT filtering behavior of the first or the second NAT router is determined as address and port-dependent if the fourth binding response is received but the fifth and the sixth binding responses are not received.

\* \* \* \* \*